Feb. 6, 1934. W. N. WOODRUFF 1,945,843
CANVAS BELT SLAT PROTECTOR
Filed Oct. 27, 1932

Inventor
W. N. Woodruff
By Arthur H. Sturges
Attorney

Patented Feb. 6, 1934

1,945,843

UNITED STATES PATENT OFFICE 1,945,843

CANVAS BELT SLAT PROTECTOR

Walter N. Woodruff, Farragut, Iowa

Application October 27, 1932. Serial No. 639,769

3 Claims. (Cl. 198—199)

This invention relates to improvements in endless belt conveyors and particularly to means for assembling the belting of the conveyor with the transversely disposed slats thereof.

The primary object of the invention is to provide a device which will be retained in an operative position in instances when it is applied to slats which have become split adjacent their ends.

Another object of the invention is to provide a device which will prevent slats from splitting and spreading in instances where it is applied to new slats.

A further object of the invention is to provide a device having means whereby the edge of the conveyor belt is properly spaced away from the ends of the slats during the application of the device to said slats and whereby said edge is spaced away from guide rails while employed in harvester conveyor machinery for preventing undue wear to the edge of the belt and insuring a proper alignment of the latter.

A still further object of the invention is to provide a device which may be operatively applied to a slat by means of a single rivet, said rivet to be countersunk for preventing excessive wear of its end.

With these and other objects in view the invention will be readily understood from the following detailed description thereof, comprising a novel construction, combination and arrangement of parts as will be hereinafter specified and claimed.

In the accompanying drawing: Figure 1 is a perspective view of a fragment of a conveyor belt having the new invention applied thereto.

Figure 1:
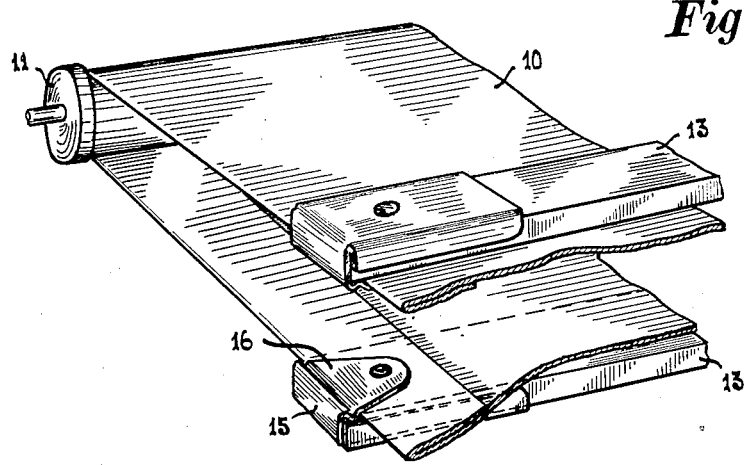
Figure 2:
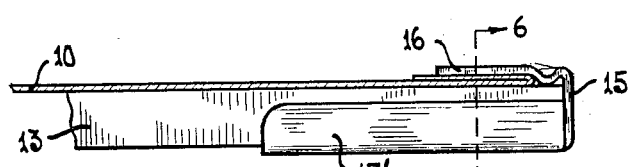
Figure 2 is a side elevation of an end portion of a slat, the conveyor belt showing in section and the new article of manufacture applied thereto.

Referring now to the drawing for a more particular description, the numeral 10 indicates an endless belt of the conveyor mechanism which is common to harvesting machinery adapted to elevate straw, headed grain and the like. The belt is flexible and comparatively wide with respect to its length and may be formed of canvas or like fabric. Cylindical crownless pulleys 11 are used in conjunction with the belt on account of the transverse width of the latter and on account of the true cylindrical shape of the pulleys the belt climbs transversely thereof in travel and use, whereby the belt becomes unevenly stretched. Also weather conditions, rain and the like affect the belt and in order to guide it in alignment with the pulleys 11, one of which is a driver and its mate an idler, channel iron guides 12 are provided at each side of the belt, which are also adapted to support the cross slats 13 attached to the belt by tacks or similar keepers, not shown.

The cross slats are used to elevate the grain or straw which is deposited upon the belt and, in use, as heretofore practised in the art, the edge of the canvas belt which contacts with the channel iron guides 12 becomes frayed thereby and ultimately worn to such an extent that efficient operation is impaired. Also the ends of the wooden cross slats 13 become worn by contact with the guides 12. It is old in the art to provide metal terminal ends for the cross slats 13, as shown in the patent to Tall No. 1,065,282 and Luckehe No. 664,054. However, the Luckehe construction does not provide a protection for the ends of the slats nor is it adapted to space the edge of the belt away from said ends and its means for protecting rivet heads, used to attach its device to the slat, is objectionable. The Tall construction does not provide a protection for the face of the slats nor is it adapted to prevent splitting thereof in a longitudinal direction in alignment with its securing rivet.

The present invention aims to provide an improved construction having the advantages pointed out herein and none of the disadvantages of the said prior art.

Figure 3:
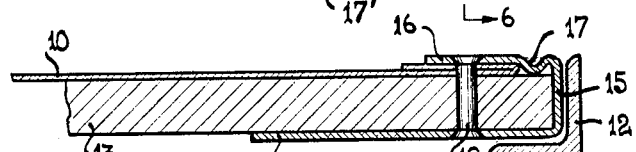
Figure 3 is a longitudinal sectional view taken along the dotted line 3—3 of Figure 4 and showing a guide rail for the conveyor belt.
Figure 4:
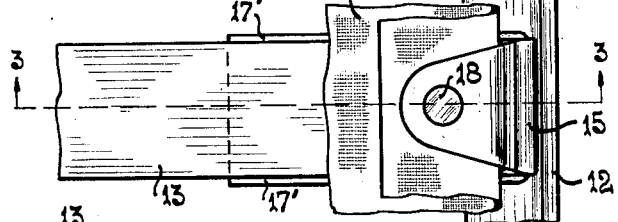
Figure 4 is a top plan view of the assembled parts shown in Figure 3.
Figure 5:
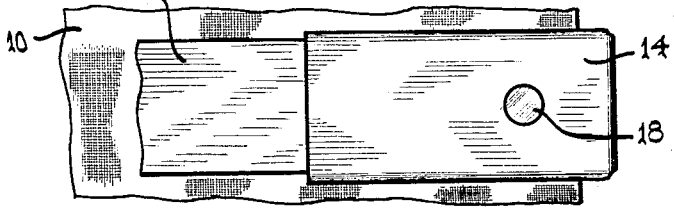
Figure 5 is a bottom plan view of the device applied to the face of a slat.
Figure 6:
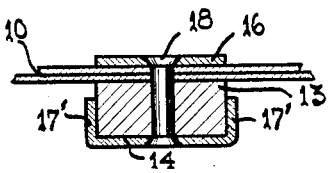
Figure 6 is a transverse sectional view taken along the dotted line 6—6 of Figure 2.

The new apparatus includes an article or device having a body portion 14 formed of sheet material adapted to engage the face of the slat opposite to the belt, as shown in Figure 3. The material is bent at a right angle to the body portion whereby a flange 15 is provided which is adapted to engage with the end of the slat and prevent the wear thereof. The flange 15 is bent, in manufacture, so that it terminates in a tang 16, which is in substantial alignment with the body portion and between the ends of the tang an abutment 17 is provided by means of crimping the material during the formation of the article. The body portion 14 is of the same width as the slat 13 and provided with a ferrule 17' at each of its sides which is bent to substantially a right angle with respect to the body portion whereby the ferrules are adapted to grip and snugly house the sides of the slat.

The slats 13 are of a uniform width and thickness and it will be understood that the new article during its manufacture is so formed that it will grip the slat on its four sides when applied, the crimp adjacent the abutment 17 facilitating the same.

To assemble the device upon a new slat of a conveyor belt, it is slipped over the end of the slat, the edge of the belt is folded, as best shown in Figures 1 and 3, and positioned so that the tang will lap over the fold, the abutment at this time providing a spacing for the folded edge which will not only prevent the latter from too closely approaching the end of the slat, but will also so align the folded edge that it will become taut and properly positioned prior to permanent riveting.

A rivet 18, best shown in Figure 3, is employed and it will be noted that the apertures through the tang and body portion are countersunk whereby the ends of the rivet may be peened flush with the exterior surfaces of said parts.

It will be noted that in operation the folded edge of the canvas is thus maintained a sufficient distance from the guide rail 12 to prevent contact and consequent wear of said edge and that the parts may be secured together in taut alignment disregarding the condition of the canvas and whether or not it is loose or wrinkled in portions and having normal texture between said portions.

Also it will be noted that during the riveting operation the slat is prevented, by means of the ferrules, from splitting or spreading towards said ferrules and that splitting or spreading of the slat in a direction at a right angle to that just described is prevented by means of the tang 16 and body portion being held in a fixed position by means of the rivet and that, as thus described, splitting or spreading of the slat in two directions is prevented.

It is obvious that the new device may be applied to old slats which have heretofore become split in use and without impairing the efficiency of said slats since the terminal ends and faces thereof may be housed and protected upon four sides and each end.

From the foregoing description it is thought to be obvious that an endless belt conveyor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as herein claimed.

Having thus described the invention, what is claimed is:

1. In a conveyor apparatus, the combination with a belt and a slat therefor, of a body portion extending transversely of the slat, a flange extending from the body portion over the end of the slat and terminating in a tang, said tang being in substantial alignment with the slat and body portion and disposed to lap the material of the belt, spacing means extending from the tang to abut the edge of the belt and maintain the same inwardly of the end of the slat, a rivet for securing the tang and body portion to the slat, and ferrules extending from the body portion at substantially right angles with respect thereto for gripping the sides of the slat, whereby upon peening the rivet the said flanges are adapted to prevent spreading or splitting of the slat.

2. In a conveyor apparatus, the combination with a belt and a slat therefor, of a body portion extending transversely of the slat, a flange extending from the body portion over the end of the slat and terminating in a tang, said tang being in substantial alignment with the slat and body portion and disposed to lap the material of the belt and having an abutment inwardly of the end of the slat for aligning the edge of the belt material with respect to the flange during the assembling of the apparatus, a rivet for securing the tang and body portion to the slat, and ferrules extending from the body portion at substantially right angles with respect thereto for gripping the sides of the slat, whereby upon peening the rivet the said flanges are adapted to prevent spreading or splitting of the slat.

3. As an article of manufacture for conveyor belt apparatus comprising a body of sheet material adapted to engage the face of a slat of a conveyor, a flange extending from the body portion and adapted to engage the end of the slat, a tang extending from the flange in substantial alignment with the body portion and adapted to lap the belt of a conveyor, said tang being provided with an abutment between its ends and adapted to engage the edge of the belt, and ferrules extending at substantially right angles from the body portion and adapted to grip the sides of the slat and prevent transverse spreading thereof.

WALTER N. WOODRUFF.